Aug. 16, 1949.                H. J. RAPUANO                2,479,406
                              BEVEL GEAR DRIVE

Filed March 29, 1946                                3 Sheets-Sheet 1

INVENTOR.
Henry J. Rapuano, Dec'd,
BY Doris H. Rapuano
                    Adm'x.
M. B. Tasker
ATTORNEY Aug. 16, 1949.   H. J. RAPUANO   2,479,406
BEVEL GEAR DRIVE Filed March 29, 1946   3 Sheets-Sheet 2

INVENTOR.
Henry J. Rapuano, Dec'd.
BY Doris H. Rapuano, Admx.
M. B. Tasker
ATTORNEY Patented Aug. 16, 1949

2,479,406

UNITED STATES PATENT OFFICE 2,479,406

BEVEL GEAR DRIVE

Henry J. Rapuano, deceased, late of Milford, Conn., by Doris H. Rapuano, administratrix, New Haven, Conn., assignor to United Aircraft Corporation, East Hartford, Conn., a corporation of Delaware Application March 29, 1946, Serial No. 658,259

2 Claims. (Cl. 74—423)

This invention relates to angle gear drives and particularly to right-angled gear drives for aircraft.

In aircraft in which a plurality of fore and aft directed propeller shafts are interconnected by transverse engine driven shafting it is necessary to transmit high torque from the engines to the shafting and from the shafting to the propeller shafts through right-angled gearing. The problem of transmitting the very high powers used in present day aircraft through right-angled gearing is made additionally difficult by the weight limitation present in this field in which it is essential that the power transmission elements including the shafting, gears and housing be kept light.

For given materials, a given service life and a given accuracy of workmanship there is a definite limit to the amount of power that can be transmitted through the conventional right-angled gear drive. In a conventional spiral bevel gear, the spiral loads and separating loads at the spiral gear teeth produce unbalanced thrust loads which cause bending moments in the gears and shafting and unbalanced nonradial loads in the bearings. These in turn set up bending moment in the gear casing, in the webs of the gears and in the shafting, all of which parts must be increased in strength to successfully resist these forces with a resulting marked increase in weight.

It is an object of this invention to provide an improved angle gear drive capable of transmitting substantially double the amount of power that can be transmitted through a conventional angle gear drive.

Another object of the invention is the provision of an angle gear drive which is light in weight.

A more specific object of the invention is to provide a right-angled gear drive in which the thrust loads generated by the gear teeth are neutralized, the loads on the bearings are radial and bending moments in the gear casing are eliminated.

Yet another object of the invention is to provide an improved right-angled gear drive system in which the driving power is transmitted on pairs of flexible torque shafts in such a manner that the power and torque is equally divided between the two shafts of each pair.

A further object of the invention is to provide an angle gear drive having improved means for adjusting the clearance between the intermeshing gears.

A still further object of the invention is generally to improve the construction and operation of angle gear drives.

Other objects and advantages of the invention will be pointed out hereinafter or will be apparent from the following detailed description of one embodiment of the invention shown by way of example in the accompanying drawings.

In these drawings.

Figure 3:
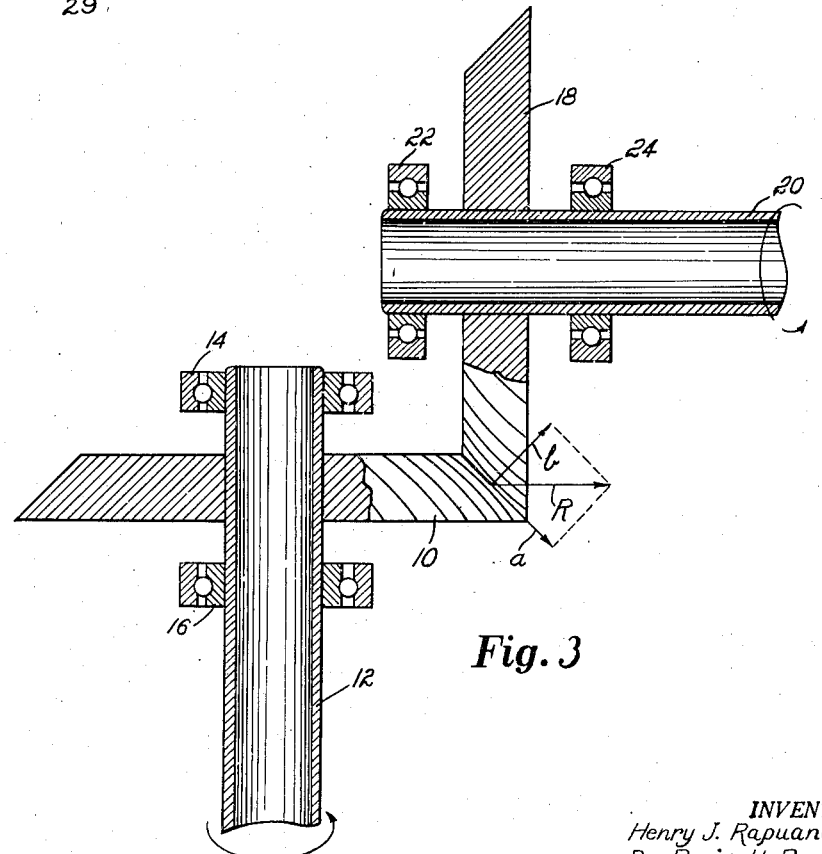
Fig. 3 is a diagrammatic illustration of a conventional right-angled bevel gear drive over which this invention constitutes an improvement.
Figure 4:
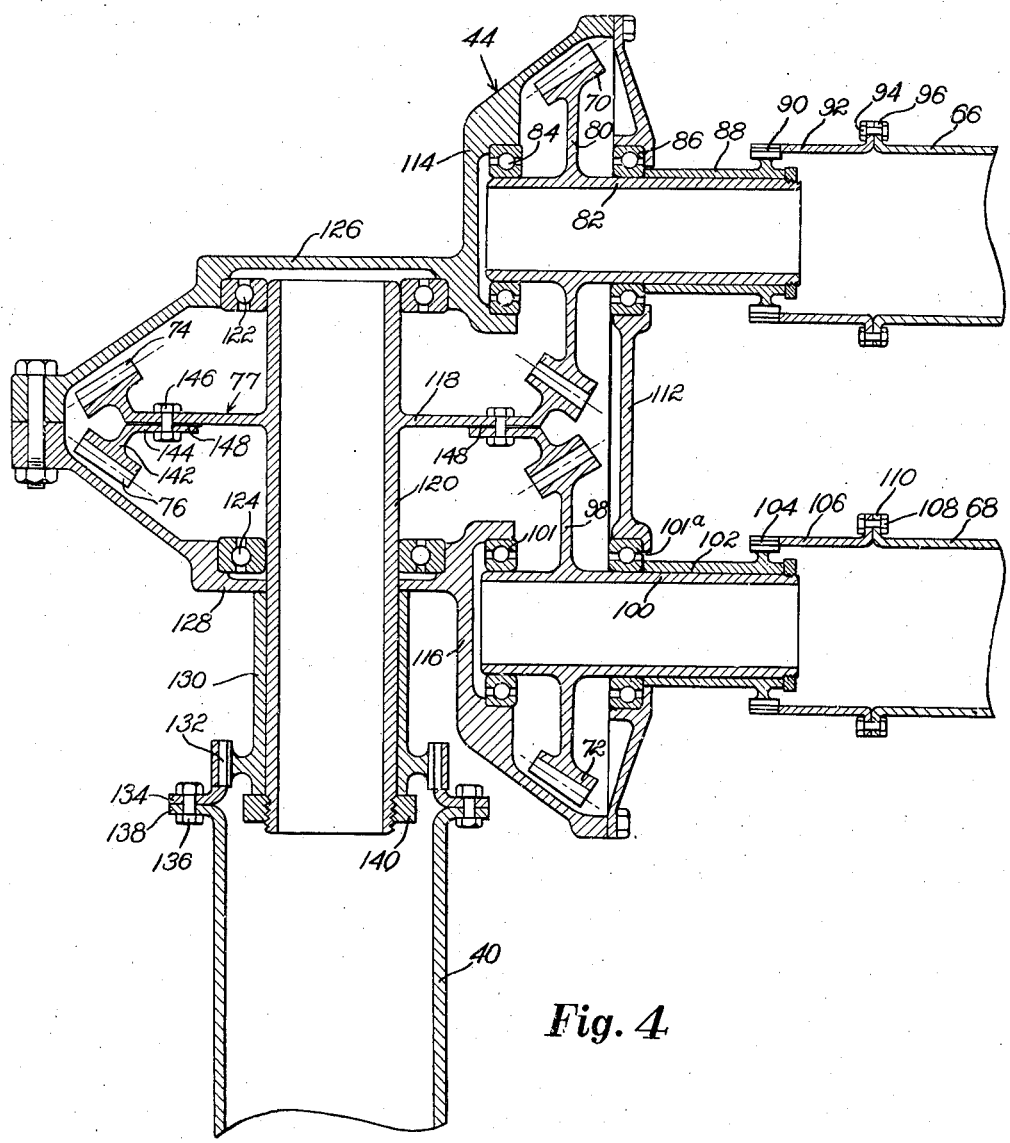
Fig. 4 is a sectional view on an enlarged scale through a right-angled gear box.

Fig. 3 illustrates a conventional spiral bevel gear drive including a gear 10 carried by a shaft 12 mounted in bearings 14, 16 which drives a meshing gear 18 on a right-angled shaft 20 mounted in bearings 22 and 24. When torque is applied to the shaft 12 in the direction of the arrow, a force represented by the vector $a$ is generated at the contacting faces of the gears due to the spiral load on the gear teeth, and a force represented by the vector $b$ is generated as the result of the separating load on the teeth. The resultant $R$ of these two forces is a thrust force exerted against the gear 18 at the pitch circle. This force not only sets up severe bending moments in the web of the gear 18 but, being an eccentric load, it sets up bending moments in the shaft 20 as well as unbalanced non-radial loads in the bearings 22 and 24. These unbalanced loads require that the web of gear 18 be very heavy, that the shaft 20 be large and that the bearings 22 and 24 also be large. Furthermore it will be evident that the bearings transmit these unbalanced loads to the housing which encloses the bevel gear drive, setting up bending moments in this housing which require that the housing be of heavy construction. Even if the resultant structure were not too heavy to be used as an aircraft drive, there is a definite limit to the horsepower which can be transmitted through such a conventional angle gear drive.

There is a definite limit to the speed in feet per minute at the gear face. There is also a definite limit in the force in pounds per square inch which can be applied to the tooth face. Further the effective area of the tooth face cannot be increased beyond a certain limit since there is a fixed maximum ratio between the diameter of the gear and the face length of the teeth of the meshing gear and pinion for a given ratio of gear and pinion diameter. If it is attempted to increase the torque transmitted through the gear drive by increasing the diameter of the gear and pinion, the permissible speed in feet per minute at the gear face is exceeded. Thus there exists for a given spiral bevel gear drive of this type a definite limit to the power which can be transmitted, and this limit is well below the horsepower output of the larger aircraft engines now in use. The gear drive of the present invention provides means for transmitting these higher horsepowers through a right-angled gear drive.

Figure 1:
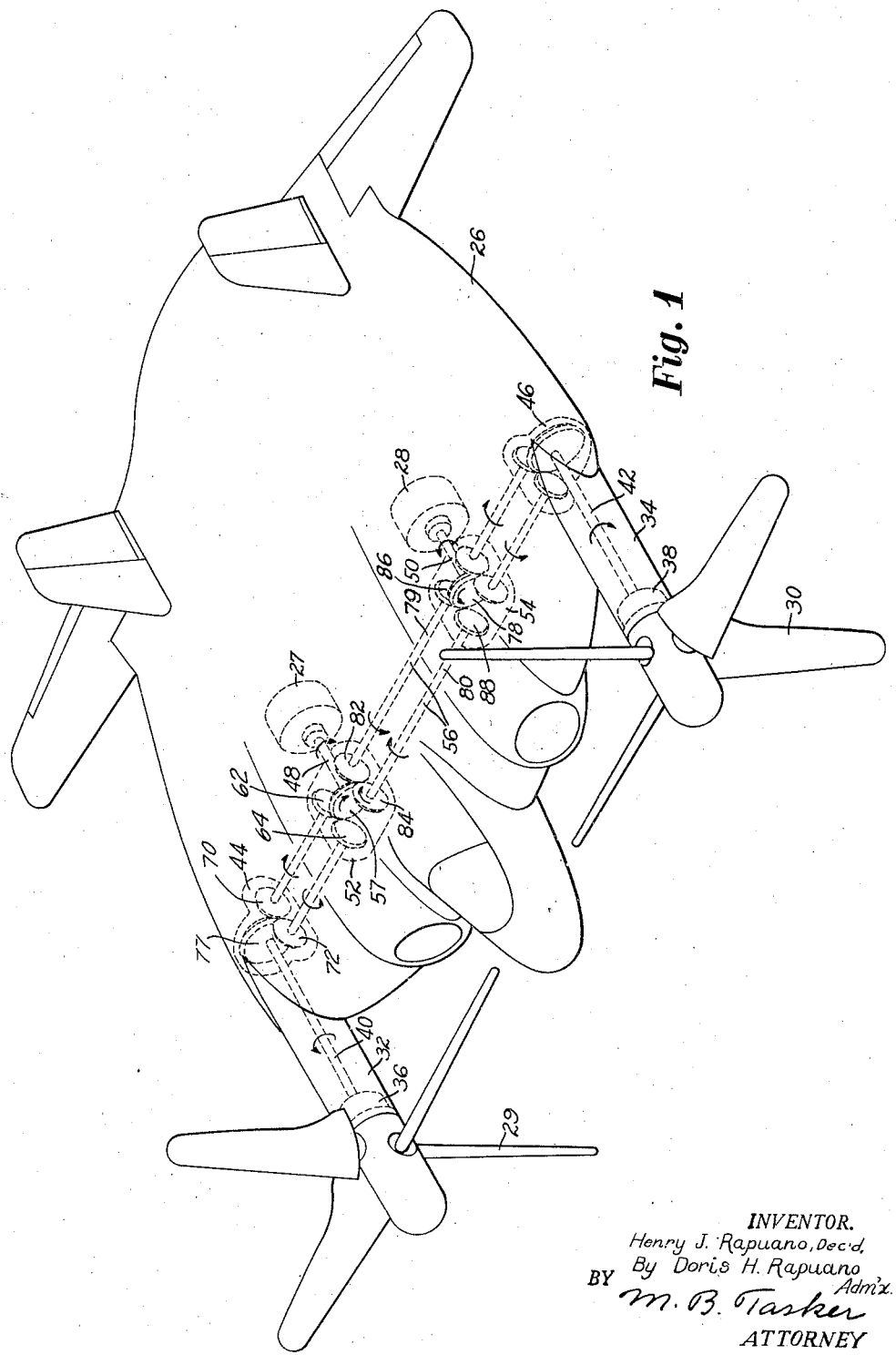
Fig. 1 is a perspective view of an airplane having right-angled drive means embodying the invention.

For purposes of illustration the gear drive of the present invention has been shown as applied to a low aspect ratio, all wing airplane 26 (Fig. 1) having two engines 27 and 28 driving two interconnected oppositely rotating propellers 29 and 30. The two engines are preferably opposite rotating engines; however two like rotating engines can be used by inserting a simple reversing gear mechanism in the drive system, preferably on one engine drive shaft between the engine and the transverse shafting. The propellers 29, 30 are carried by forwardly projecting nacelles 32, 34 located at the opposite lateral extremities of the leading edge of the wing which house the usual reduction gearing 36, 38 and propeller drive shafts 40, 42 which have their aft ends terminated in angle gear boxes 44, 46, respectively. The reduction gearing 36, 38 are identical providing opposite rotation of the propeller 29 relative to the propeller 30.

Figure 2:
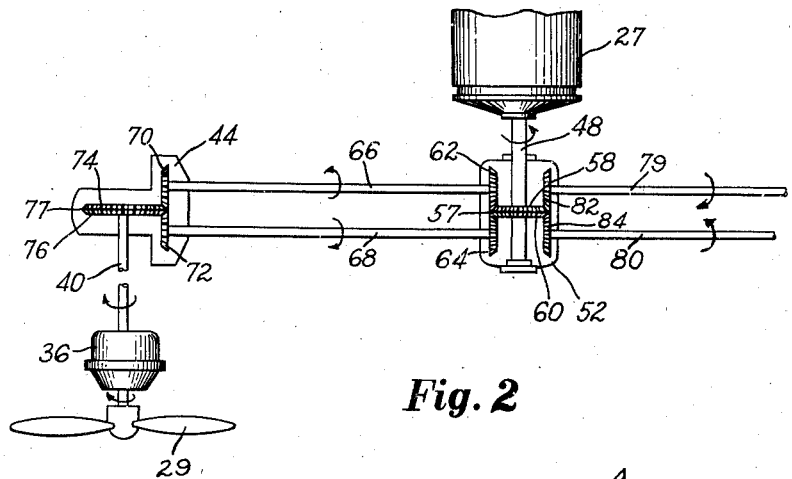
Fig. 2 is a somewhat diagrammatic view on an enlarged scale of the improved drive means.

Engines 27, 28 drive shafts 48, 50 which are suitably supported at their forward ends in gear boxes 52, 54 respectively and are interconnected with each other and with the propeller drive shafts 40, 42 by shafting generally indicated at 56 which extends transversely between the several gear boxes 44, 52, 54 and 46. The drive system is symmetrical on opposite sides of the longitudinal center line of the airplane and accordingly the drive means associated with the right hand side of the wing has been shown on a larger scale in Fig. 2 to which reference is made for a more detailed description of the drive improvements constituting the invention.

The forward end of engine driven shaft 48 which is disposed within gear box 52 carries a gear 57 having double spiral bevel gear faces 58 and 60 meshing respectively with a pair of equal diameter spiral bevel gears 62, 64 fixed to the inboard ends of two transverse hollow drive shafts 66 and 68, preferably of aluminum alloy, which extend outboard in parallel relation and at right angles to shaft 48 and carry at their outboard ends a pair of equal diameter spiral bevel gears 70 and 72 disposed in the angle gear box 44. The spiral bevel faces of the gears 70, 72 mesh with the opposed bevel gear faces 74, 76 of a double spiral bevel gear 77 fixed on the aft end of propeller drive shaft 40 and located to rotate in the same plane as gear 57.

The drive shaft 50 of engine 28 is similarly connected to propeller drive shaft 42. In order that either engine may drive both propellers in the event of failure of the other engine, means are provided for interconnecting the double bevel gear 57 in the gear box 52 with the corresponding double bevel gear 78 in the gear box 54. To this end two parallel hollow drive shafts 79, 80 are provided which extend transversely between gear boxes 52 and 54. These shafts carry pairs of spiral bevel gears 82, 84 and 86, 88 at their opposite ends which mesh respectively with the double bevel gears 57 and 78 in gear boxes 52, 54.

Referring again to the right hand angle drive, it will be noted (Fig. 2) that torque loaded shafts 66 and 68 are of like diameter and material and have a like amount of flexibility and that, since the bevel gears 62 and 64 are of equal diameter and are driven by like bevel gear faces 58 and 60 of the same gear 57, they are always equally torque loaded. Also, since gears 70, 72 on the outboard ends of shafts 66 and 68 are of equal diameter, the combined torque and power loading of these shafts transferred to gear 77 and propeller drive shaft 40 is equally divided between these parallel shafts. It will be apparent that in conventional rigid shafting, inaccuracies of manufacture or lack of manufacture of the gears to extremely close tolerances would tend to cause one or the other of the shafts to carry more than its proportionate share of the load, whereas in the present invention the flexibility of the shafting will have the inherent tendency to correct any minor inaccuracies of manufacture of the drive system components with the result that the torque and power loading under all conditions will be equally divided between the parallel transverse shafts with their attached gears.

Preferably the bevel gears 70, 72 are forged gears. The gear 70 includes an integral web 80 and a hollow axial hub 82 which is journalled in anti-friction bearings 84 and 86 carried by the angle gear box 44. The part of hub 82 which extends outside the casings carries a sleeve 88 which has a splined connection at 90 to a flanged drive member 92 which is connected by bolts 94 with a similar flange 96 on the outboard end of shaft 66. The gear 72 is provided with a similar integral web 98 and hollow hub 100. The hub 100 is journalled in anti-friction bearings 101 and 101a in the casing 44. Hub 100 carries a sleeve 102 having a splined connection 104 to a flanged drive member 106 which is connected by bolts 108 to the flange 110 on the outboard end of the shaft 68.

It will be noted that the bearings 86 and 101a are supported in a casing wall 112 which is disposed at right angles to the axes of shafts 66 and 68 while bearings 84 and 101 are similarly disposed in casing walls 114 and 116 of casing 44 which are parallel with wall 112 and are thus at right angles to shafts 66 and 68.

The gear 77 is also of very light construction having a thin web 118 integral with a hollow hub 120 which is journalled in the casing 44 in anti-friction bearings 122 and 124. Here again it will be noted that these bearings are carried by parallel casing walls 126 and 128 which are at right angles to the axis of the hub 120. The portion of the hub 120 which extends forwardly through wall 128 carries a drive sleeve 130 which has a splined connection 132 with a flange member 134 which is connected by peripherally arranged bolts 136 with flange 138 on the aft end of propeller drive shaft 40, the drive sleeve 130 being secured axially on hub 120 by suitable means such as a nut 140.

The forged double bevel gear 77 has its annular gear face 74 formed integral with the web 118 thereof and the other annular gear face 76 formed as a separate member 142 having an annular web flange 144 which is secured to the web 118 of gear 77 by a series of peripherally spaced bolts 146. Clamped between the web flange 144 and web 118 are a plurality of annular shims 148 which may be of various thicknesses by the removal of which the clearance between the annular gear faces 74, 76 of gear 77 and the meshing gears 70, 72 can be varied.

Since the forces exerted on gear 77 by pinion 70 are exactly neutralized by like forces exerted thereon by pinion 72, it will be clear that no bending moments are set up in the web 118 or the gear hub 120. Thus the bearings 122 and 124 receive only purely radial loads and, since the casing walls 126 and 128 in which the hub is journalled are disposed at right angles to the axis of the hub, these casing walls have no bending moments set up therein, all loads being exerted in a direction to stress these casing walls either in tension or compression. Accordingly, the web 118 and the hub 120 can be very thin light sections and the casing walls can also be correspondingly light as compared with constructions required in conventional right-angled gearing.

Preferably the transverse shafting 56 is made of tubular light-metal alloy, while shafts 40 and 42 are made of a stronger metal tubing. It is not only possible to make the shafts and the gears lighter than is possible with conventional right-angled gearing but since the bending moments previously set up in the casing are eliminated and all unbalanced thrusts are eliminated in the bearing the casing itself is also freed from bending moments and accordingly can be very much lighter than in conventional gearing.

It will be evident that as a result of this invention it has been made possible to transmit substantially twice the amount of power that can be transmitted through a conventional angle gear drive. It will also be evident that as a result of this invention a right-angled gear drive has been provided by which conventional horsepower for such drives can be transmitted with marked savings in the weight of the drive system, thus making these improvements of vital concern in aircraft construction.

While one specific embodiment of the invention has been described herein and shown in the accompanying drawings for purposes of illustration, it will be understood that the embodiment shown is for purposes of illustration only and that various changes in the construction and arrangement of the parts may be made without departing from the scope of the invention as defined in the appended claims.

What it is desired to secure by Letters Patent is:

1. In an airplane drive having a fore and aft extended propeller shaft and two parallel transverse driving shafts, right angled gears at the intersection of said shafts including a double faced bevel gear on the aft end of said propeller shaft and bevel pinion gears on the ends of said driving shafts, a casing enclosing said bevel gears including three casing sections one of which is disposed at substantially right angles to two of said sections, each of said two sections having plate-like walls disposed at right angles to each other, one of said walls in one of said two sections cooperating with one of said walls in the other of said two sections for carrying said double faced gear therein, a plate-like wall in said one section cooperating with the other of said walls in said two sections for carrying said pinion gears, said gears having integral webs and hubs journalled in their respective walls, and means external of said casing sections providing driving connections between said hubs and said shafts.

2. In an airplane drive having a fore and aft extended propeller shaft and two parallel transverse driving shafts, a T-shaped gear casing at the intersection of said shafts, the horizontal leg of the T including a first casing section having two pairs of parallel plate-like walls, a hub journalled in each of said pairs of walls and carrying integral driving bevel pinion gears, each of said hubs having splines thereon external of said casing meshing with cooperating splines on each of said driving shafts, a second casing section having two spaced parallel plate-like walls each perpendicular to and merging with one wall of said pairs of walls in said first section, a hollow hub journalled in said spaced parallel walls and having an integral web, a driven bevel gear carried by said web, said bevel gear meshing with one of said pinion gears, a ring gear connected to said web having a bevel opposite to said driven gear for meshing with the other of said pinion gears, and splines on said hollow hub external of said second case section for operatively connecting said propeller shaft to said hub.

DORIS H. RAPUANO,
*Administratrix of Estate of Henry J. Rapuano, Deceased.*

REFERENCES CITED

The following references are of record in the file of this patent:

UNITED STATES PATENTS

| Number | Name | Date |
|---|---|---|
| 1,384,483 | Penrod | July 12, 1921 |
| 2,011,355 | Devener | Aug. 13, 1935 |
| 2,101,515 | Schmitter | Dec. 7, 1937 |
| 2,131,015 | Sanford | Sept. 20, 1938 |
| 2,293,279 | Chilton | Aug. 18, 1942 |
| 2,297,400 | Friedrich | Sept. 29, 1942 |
| 2,315,409 | Fredden | Mar. 20, 1943 |
| 2,342,672 | Kinnucan | Feb. 29, 1944 |

FOREIGN PATENTS

| Number | Country | Date |
|---|---|---|
| 116,149 | Great Britain | May 31, 1918 |